United States Patent

Hayakawa

(10) Patent No.: US 9,639,303 B2
(45) Date of Patent: May 2, 2017

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Takeshi Hayakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/953,643

(22) Filed: Nov. 30, 2015

(65) Prior Publication Data

US 2016/0154612 A1 Jun. 2, 2016

(30) Foreign Application Priority Data

Dec. 2, 2014 (JP) ................................. 2014-243745

(51) Int. Cl.
*G06F 3/12* (2006.01)

(52) U.S. Cl.
CPC .......... *G06F 3/1206* (2013.01); *G06F 3/1248* (2013.01); *G06F 3/1292* (2013.01)

(58) Field of Classification Search
USPC ....................................................... 358/1.15
See application file for complete search history.

(56) References Cited

U.S. PATENT DOCUMENTS

| 2004/0081203 | A1* | 4/2004 | Sodder .................. A61B 6/488 370/469 |
| 2013/0083353 | A1 | 4/2013 | Nishikawa et al. |
| 2013/0321649 | A1* | 12/2013 | Yamamoto ......... H04N 5/23229 348/207.1 |
| 2015/0022857 | A1* | 1/2015 | Tsugimura ............ G06F 3/1244 358/1.15 |
| 2015/0092221 | A1* | 4/2015 | Ochi ..................... G06F 3/1222 358/1.14 |
| 2016/0070676 | A1* | 3/2016 | Riemers ............ G06F 17/30554 715/229 |

FOREIGN PATENT DOCUMENTS

JP 2013-077141 A 4/2013

* cited by examiner

*Primary Examiner* — Jerome Grant, II
(74) *Attorney, Agent, or Firm* — Carter, DeLuca, Farrell & Schmidt, LLP

(57) ABSTRACT

An information processing apparatus and a method for controlling the information processing apparatus are disclosed. The method includes selecting a file to be printed and storing a rendering method as a previous value, which is determined from two methods. The method also includes determining whether or not the file is in a specific format and determining whether or not there is a previous value if it is determined that the file is in a specific format. The method further includes deciding the rendering method for the file to be the first method it is determined that the file is not in the specific format, and deciding the rendering method for the file to be a rendering method of the previous value if it is determined that there is a previous value.

20 Claims, 20 Drawing Sheets

INFORMATION PROCESSING APPARATUS, CONTROL METHOD, AND STORAGE MEDIUM

BACKGROUND OF THE INVENTION

Field of the Invention

The invention relates to an information processing apparatus, in particular, an information processing apparatus that performs switching a rendering method from a mobile terminal.

Description of the Related Art

In recent years, there is a technique for printing for a printer communicating with a mobile terminal from an application for printing in the mobile terminal such as a smart phone (hereinafter, simply referred to as "the mobile terminal"). In this case, a processing for rendering a file, an image, and the like, which are to be printed, is required in the process of printing from the mobile terminal. Japanese Patent Laid-Open No. 2013-77141 discloses a technique in which a processing server is prepared separately from the mobile terminal and the processing server performs the rendering processing and a RIP (Raster Image Processer) processing.

SUMMARY OF THE INVENTION if the printer performs printing from the mobile terminal, the data formats that can be handled are often limited. For example, if the data format is BPM, PNG, and the like, which are commonly used in the mobile terminal, the function of an operating system (hereinafter, refer to as "OS") in the mobile terminal can perform rendering. However, a print application must provide a rendering engine for data format other than those formats. Note that the data format by which the rendering engine can perform rendering is also limited, and the data format by which the printing can be performed is limited. Accordingly, a method for rendering a variety of data formats to the image data having a general purpose performance such as JPEG or BMP, converting the rendered image data to PDL data, and printing the PDL data is widely used. However, since a user cannot determine a specification and a limitation of the rendering engine, there is a possibility that an inappropriate rendering engine will be used.

The invention provides an information processing apparatus that can automatically switch a rendering engine in accordance with a format of a file to be printed if there are a plurality of rendering engines for printing from a mobile terminal.

According to the invention, an information processing apparatus is provided that includes a selecting unit configured to select a file to be printed; a storage unit configured to store a rendering method as a previous value, which is determined by two methods: a first method for rendering the file in a server and a second method for rendering the file in the information processing apparatus; a first determining unit configured to determine whether or not the file is in a specific format; a second determining unit configured to determine whether or not there is the previous value stored by the storage unit if the first determining unit determines that the file is in a specific format; and a deciding unit configured to decide the rendering method for the file to be the first method if the first determining unit determines that the file is not in the specific format, and decide the rendering method for the file to be a rendering method of the previous value if the second determining unit determines that there is a previous value.

According to the invention, an information processing apparatus can be provided that can switch automatically a rendering engine in accordance with a format of a file to be printed if there are a plurality of rendering engines for printing from a mobile terminal. In addition, the rendering engine is switched automatically in accordance with a function that is supported, and thus the user can perform efficient printing.

Further features of the present invention will become apparent from the following description of exemplary embodiments with reference to the attached drawings.

DESCRIPTION OF THE EMBODIMENTS

Hereinafter, preferred embodiments of the invention will be described with reference to the drawings.

(First Embodiment)

Figure 1:
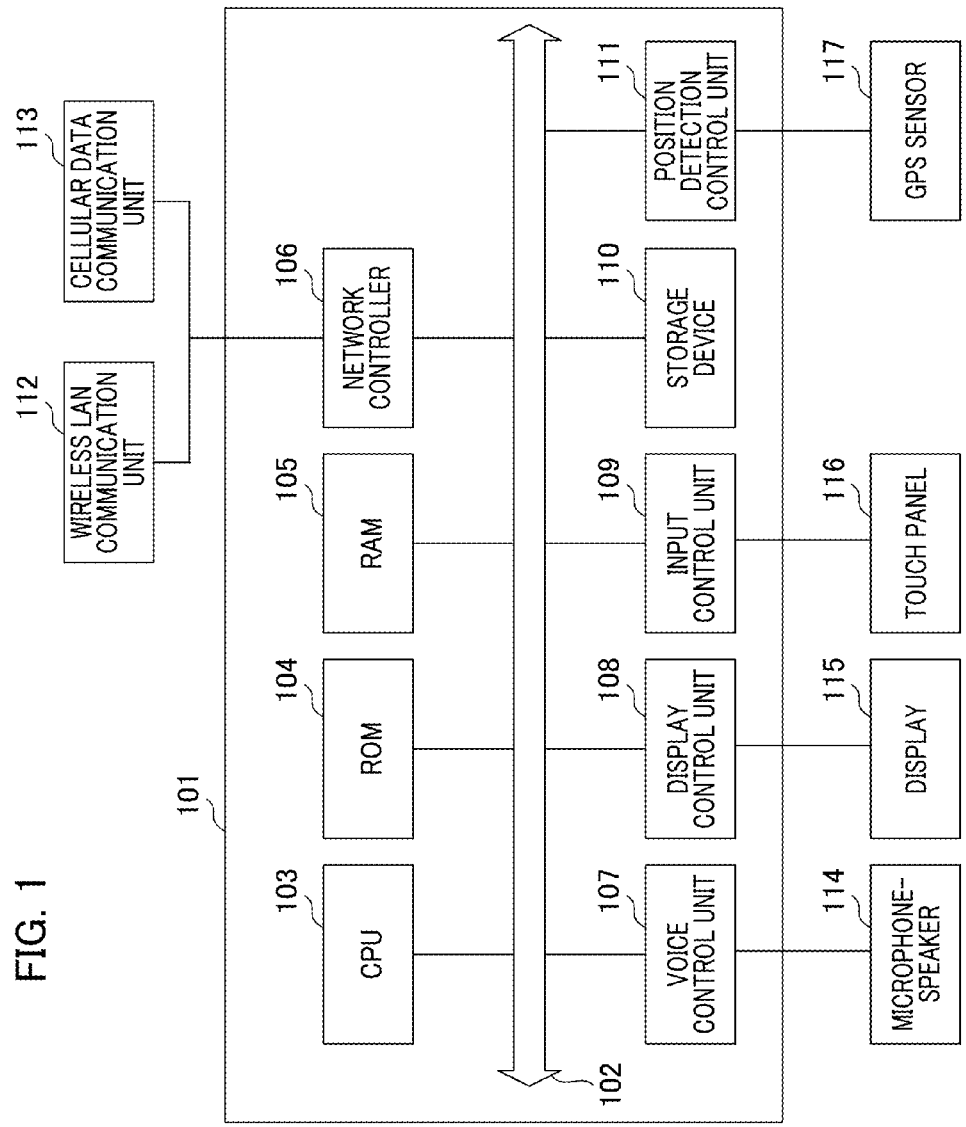
FIG. 1 is a block diagram illustrating a hardware configuration of a mobile terminal.

FIG. 1 is a block diagram illustrating a hardware configuration of a mobile terminal according to the present embodiment. Each of the components of the hardware in the mobile terminal 101 is respectively connected to a system bus 102. The mobile terminal 101 can use a variety of services accessible to a wireless network that a wireless LAN and an outdoor mobile communication carrier (hereinafter, referred to as "the mobile carrier") provide. Note that the mobile terminal may be an information processing apparatus for mobile such as a smart phone. An application for controlling an operating system (OS), a call, a data communication, and the like is stored in a ROM 104, and each application is executed in a CPU (Central Processing Unit) 103. For example, the application for controlling a data communication is a Mail software, a Web browser, and the like.

A RAM 105 functions as a work memory area for executing a program. Also, the RAM 105 functions as a memory for temporarily storing Web page data obtained by the Web browser from the Web server, authentication information for accessing a Web service, and the like. A storage device 110 is a nonvolatile storage device and stores various operation mode settings that are required to retain after restarting the mobile terminal, an operating log, and the like.

A Network Controller 106 performs communication control of a wireless LAN communication unit 112 and a cellular data communication unit 113 for joining the network provided by the cellular carrier. In general, when the mobile terminal joins the wireless LAN network, the Network Controller 106 prioritizes the wireless LAN connection. If the mobile terminal is out of the network area of the wireless LAN, the mobile terminal joins the wireless communication network provided by the mobile carrier. A voice control unit 107 is primarily started by a call application and is used while the user is making a phone call. When the user makes the phone call, an input and output of voice data is performed by a microphone-speaker 114.

A display control unit 108 controls information output by a display 115 of the mobile terminal 101. An input control unit 109 controls information for which instructions are provided by the user using a button, a touch panel 116, or the like of the mobile terminal. Each application in the mobile terminal provides network communication information, various information about the mobile terminal, and the like using the voice control unit 107, the display control unit 108, and the input control unit 109. A position detection control unit 111 obtains position information of the mobile terminal from a GPS sensor 117 and provides the position information to the OS. These controls are controlled by the OS running on CPU 103.

Figure 2:
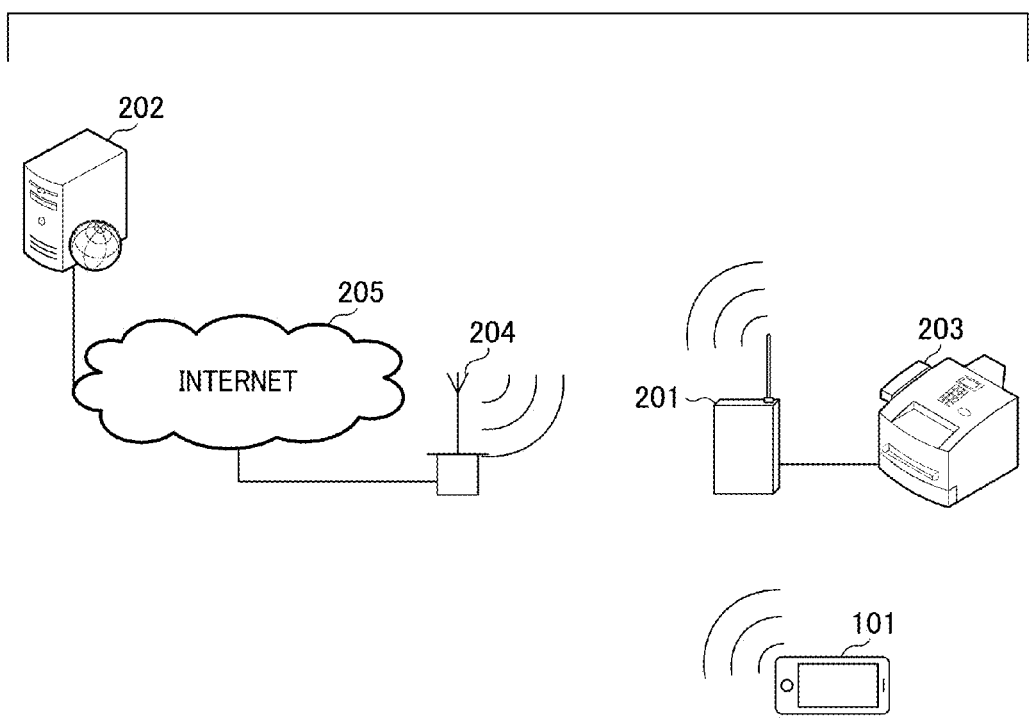
FIG. 2 is a diagram illustrating an entire system including the mobile terminal and peripheral devices.

FIG. 2 is a diagram illustrating an entire system including the mobile terminal and peripheral devices. The system according to the present embodiment comprises the mobile terminal 101, a wireless LAN terminal 201, a Web server 202, a printer 203, a wireless base station 204, and an internet 205. The wireless LAN terminal 201 is a base unit of the wireless LAN having a common network router function and provides the wireless LAN within, for example, home or office. If the mobile terminal 101 enters the wireless LAN area, the mobile terminal 101 automatically joins the network using the authentication information that has been set in advance. The printer 203 joins the network via the wired or wireless LAN.

The wireless terminal 201 is accessible to all of the peripheral devices and the services which join the network. The wireless base station 204 is a base station of a wireless communication provided by the mobile carriers. If the mobile terminal 101 goes out of the area of the wireless LAN 201, the mobile terminal 101 joins the network provided by the wireless base station 204. The mobile terminal 101 accesses the internet 205 via the network provided by the wireless base station 204, and further accesses the Web server 202. A URL of the Web server 202 is set in a print application 304 (described below), and the user is not involved in how the Web server 202 is operated. Note that a print instruction to the printer 203 via the print application is executed by cloud printing.

Figure 3:
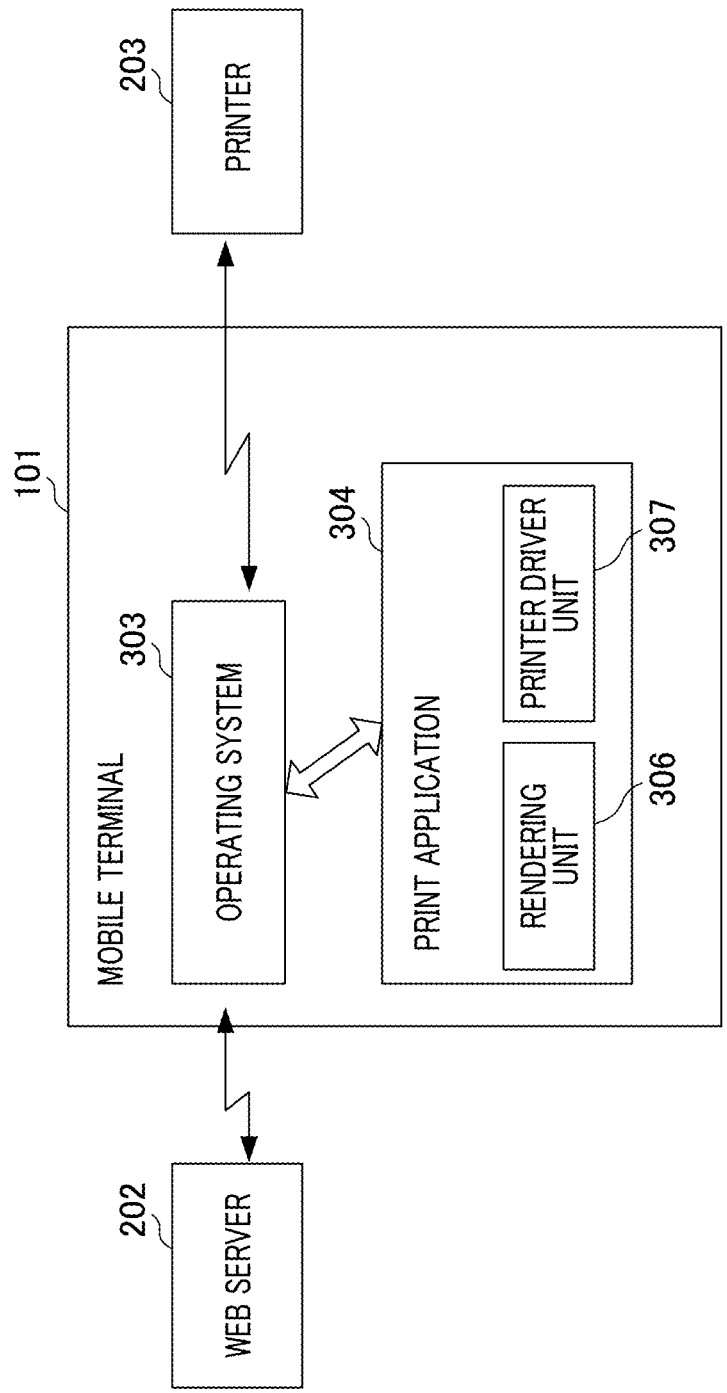
FIG. 3 is a diagram illustrating a software configuration of the mobile terminal.

FIG. 3 is a diagram illustrating a software configuration of the mobile terminal. In the present embodiment, the print application 304 is installed in the OS (operating system) 303 of the mobile terminal 101, and the print application 304 performs the processing using the CPU 103. In order to communicate with the Web server and the printer 203 from the print application 304, the network controller 106 controlled by the OS 303 is used. The print application 304 comprises a rendering unit 306 configured to perform rendering and a printer driver unit 307 configured to perform print processing. The print application 304 converts the image data rendered by the printer driver 307 to the PDL and performs the print instruction to the printer 305 via the OS 303. Note that the PDL is a dedicated language for communication and print with the printer 305.

Figure 4:
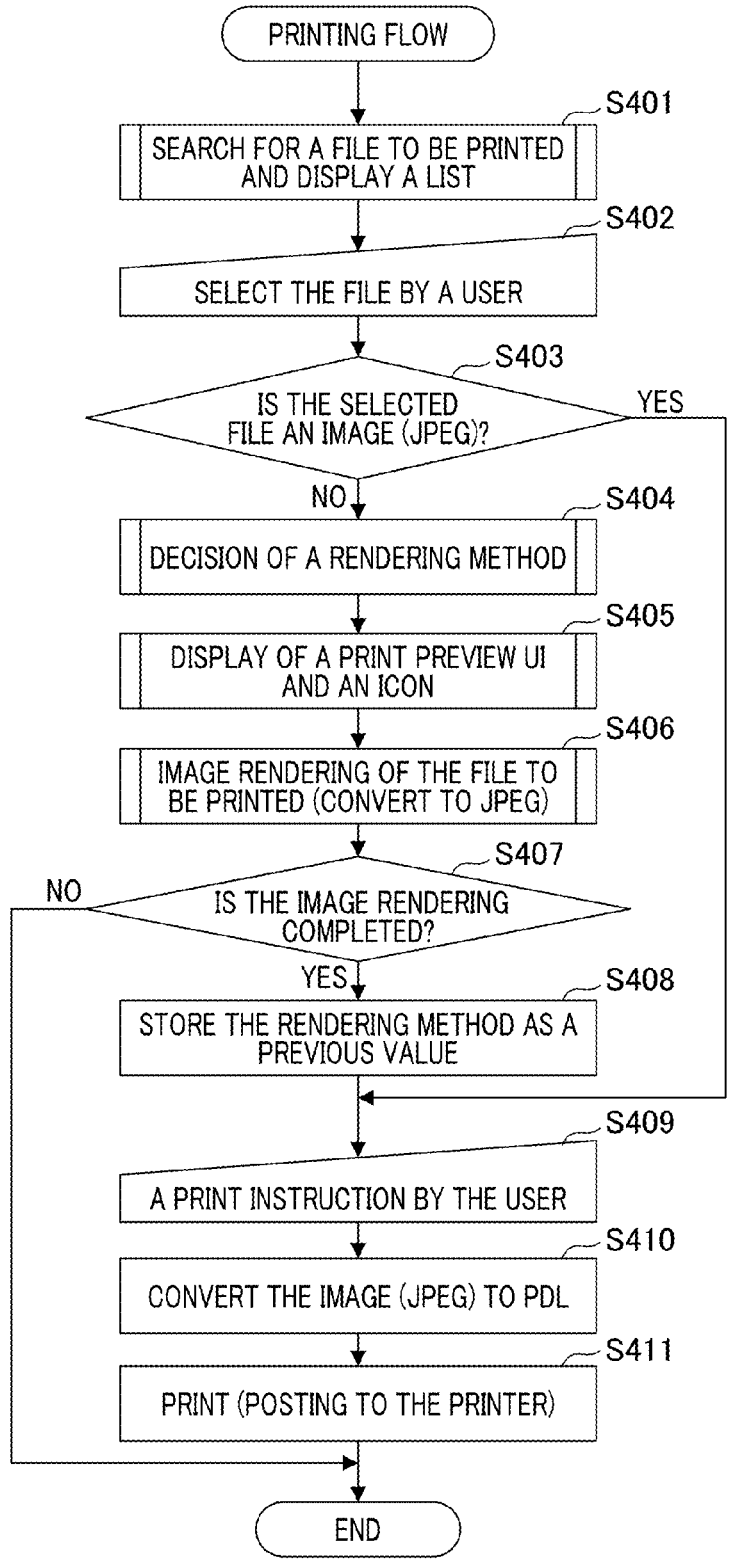
FIG. 4 is a flow chart illustrating a printing processing by a printing application.

FIG. 4 is a flow chart illustrating print processing by the print application 304. The flow chart shown in FIG. 4 is performed by the mobile terminal 101 and the printer 203 shown in FIG. 3. The processing of the print application 304 is performed by the information processing apparatus, which is the mobile terminal 101. The mobile terminal 101 shown in FIG. 1 stores a program code of software for realizing the flow chart in the storage medium. The system or the CPU 103 of the device reads out the program code stored in the RAM 105 or the storage device 110 and performs each processing of the flow chart. The processing is common in the flowchart of later.

Firstly, in step S401, the print application 304 searches for the file to be printed in the mobile terminal 101. Note that the details of this processing will be described below with reference to FIG. 5. Next, in step S402, the user selects a file among the displayed files. Next, in step S403, the print application 304 determines whether or not the selected file is image data. Note that the image data used in the present embodiment is in the JPEG format. However, it is not limited to the JPEG format, and an image file format (for example, BMP, PNG, or the like) with which the OS 303 can perform rendering may be adopted.

If it is determined that the selected file is image data (Yes) in step S403, the processing proceeds to step S409, and the print application 304 waits the print instruction by the user. In contrast, if it is determined that the selected file is not the image data (NO), the processing proceeds to step S404, and the decision about the rendering method is performed. This processing will be described below. In the present embodiment, the file that is not image data indicates a PDF file and a document file. Next, in step S405, an icon of a print preview UI and the rendering method is displayed. The processing for changing the display of this icon of the print preview UI and the rendering method will be described below with reference to FIG. 7.

Next, in step S406, the print application 304 performs an image rendering of the selected file to be printed. This processing of the image rendering will be described below with reference to FIG. 8. Next, in step S407, the print application 304 determines whether or not the image rendering has completed. If the image rendering has not completed (NO), the print processing ends because the printing cannot be performed. In contrast, if the image rendering is completed (YES), the processing proceeds to step S408.

Then, in step S408, the print application 304 stores (saves) the rendering method used in step S406 as a previous value, and the processing proceeds to step S409. Next, in step S409, the print application 304 waits for the print instruction by the user, and when the print application 304 receives the print instruction, the processing proceeds to step S410. Then, in step S410, the printer driver unit 307 converts the image data into PDL data. Next, in step S411, the print application 304 sends the PDL data generated by the printer driver unit 307 to the printer 203, and the printer 203 performs the printing. Note that, in the present embodiment, the communication with the printer 203 is performed via the OS 303. As described above, the print processing of the print application 304 is completed.

Figure 5:
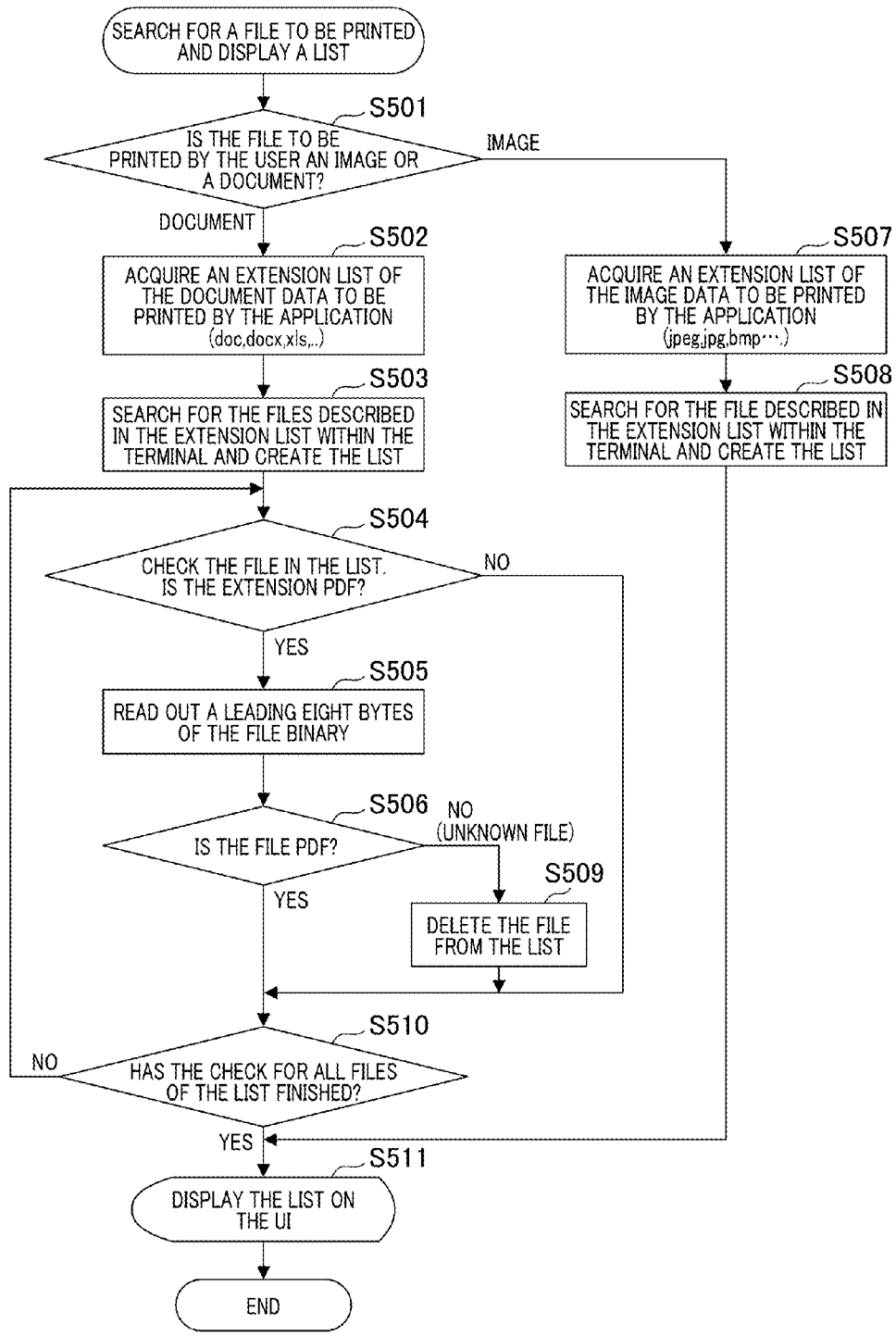
FIG. 5 is a flow chart illustrating processing for a list displaying the files to be printed.

FIG. 5 is a flow chart illustrating the details of the processing (selecting unit) for searching for the file to be printed and list displaying the file in step S401 of the flow chart shown in FIG. 4. Firstly, in step S501, the print application 304 determines whether the data of the user to be printed is image data or document data. Document data denotes the PDF data or the document data. If the data is image data (image), the processing proceeds to step S507. If the data is document data (document), the processing proceeds to step S502.

Next, in step S507, the print application 304 acquires a printable file extension list of the image data. Here, the extension is a string for identifying the file type attached to the end of the file name defined in the OS 303. In the present embodiment, the extension list acquired in step S507 is for example, "jpeg", "jpg", "bmp", or the like. Next, in step S508, the print application 304 searches for the file described in the extension list acquired in step S507 within the mobile terminal 101, and creates the list. Then, the processing proceeds to step S511, and the print application 304 displays the list on the UI.

In contrast, if the data is the document data in step S501, in step S502, the print application 304 acquires a printable file extension list of the document data. Here, the extension is the string for identifying the file type attached to the end of the file name defined in the OS 303. In the present embodiment, the extension list acquired in step S502 is for example, "pdf", "doc", "ppt", or the like.

Next, in step S503, the print application 304 searches for the file described in the extension list acquired in step S502 within the mobile terminal 101, and creates the list. Next, in step S504, the print application 304 checks the file of the list acquired in step S503, and determines whether or not the extension is the "pdf". Note that, in the present embodiment, the list has one or more files, and they are checked sequentially.

If it is determined that the extension is not "pdf" in step S504 (NO), the processing proceeds to step S510. In contrast, if it is determined that the extension is "pdf" in step S504 (YES), the processing proceeds to step S505. Then, in step S505, the print application 304 reads out the leading eight bytes of the file that has been determined to by "pdf". This is because it is understood exactly whether or the file is a PDF file by reading out the leading eight bytes in the structure of the PDF data.

Then, in step S506, the print application 304 determines whether or not identification information indicating the PDF file is included in the leading eight bytes. This is because the PDF format is widely used and there area few files such as a corrupted file or the a file that does not follow the official format. Therefore, the print application 304 reads out the leading eight bytes in step S505 and strictly determines whether or not the file is a PDF file. If it is determined that the file is a PDF file in step S506 (YES), the processing proceeds to step S510. In contrast, it is determined that the file is not a PDF file in step S506 (NO), the processing proceeds to step S509. In step S509, the print application 304 deletes the file from the list.

Next, in step S510, it is determined whether or not the check for all files of the list has finished. If it is determined that the check for all files has not finished (NO), the processing returns to step S504, and the print application 304 checks next file. In contrast, if it is determined that the check for all files has finished (YES), the processing proceeds to step S511. In step S511, the print application 304 displays the list on the UI.

Figure 6:
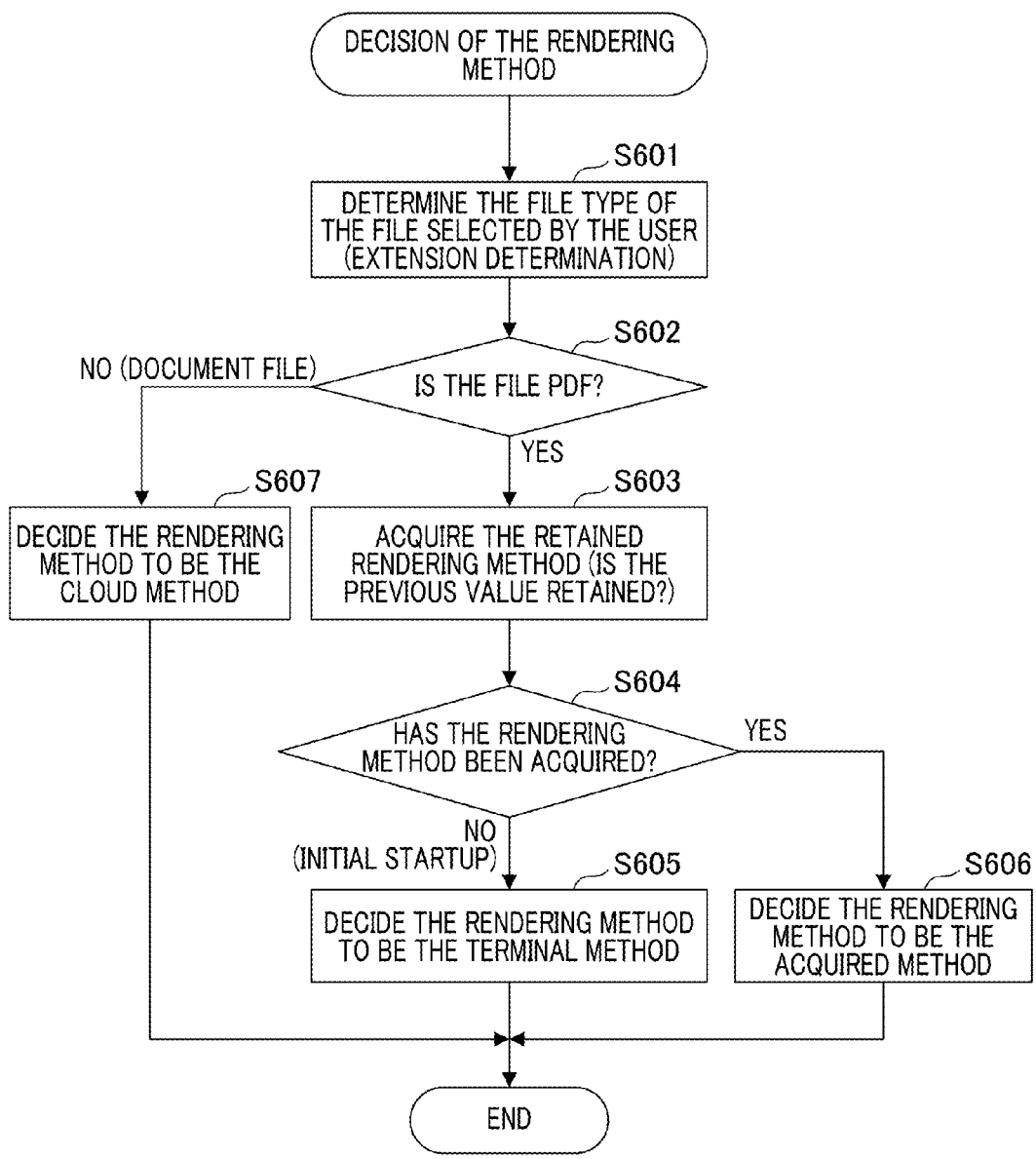
FIG. 6 is a flow chart illustrating processing for deciding a rendering method.

FIG. 6 is a flow chart illustrating the details of the processing for deciding the rendering method in step S404 shown in FIG. 4. In the present embodiment, the rendering method includes at least a cloud method (a cloud rendering; a first method), in which the rendering is performed on the server (the cloud), and a terminal method (a terminal rendering; a second method), in which the rendering is performed on the mobile terminal (the information processing apparatus) 101. Also the rendering method is not limited to these methods, and another method may be adopted. Firstly, in step S601, the print application 304 discerns the file type selected by the user. More specifically, the print application 304 discerns the file type by using the extension. Next, in step S602, it is determined whether or not the file type is PDF file (a first determining unit). If it is determined that the file type is a PDF file (YES), the processing proceeds to step S603. If it is determined that the file type is not a PDF file (NO), that is, if the file type is a document file, processing proceeds to step S607.

Then, in step S607, the print application 304 decides the rendering method of the document file which is not the PDF file to the cloud method. This method is a method for rendering by using the Web server 202 shown in FIG. 3. That is, since the rendering of the document file is not performed by the rendering unit 306, the rendering is performed by using the cloud method. Therefore, since there is a constraint on the file formats that the rendering unit 306 can handle and the rendering unit 306 cannot perform the rendering for all file formats, the applicable rendering is required.

Next, in step S603, the print application 304 acquires the rendering method retained by the print application 304. This is a value stored in the processing in step S408. Next, in step S604, the print application 304 determines whether or not the rendering method has been acquired (a second determining unit). That is, the print application 304 determines whether or not the previous value has been retained. If the rendering method has not been acquired (NO), that is, if the previous value has not been retained such as during an initial startup, the processing proceeds to step S605. Then, in step S605, the print application 304 decides that the rendering method is the terminal method. Here, the terminal method is a method in which the rendering is performed in the mobile terminal 101, and the rendering unit 306 of the print application 304 performs the rendering. In contrast, if the rendering method is acquired in step S604 (YES), the processing proceeds to step S606. Then, in step S606, the print application 304 decides that the rendering method is the acquired method. That is, the print application 304 decides that the rendering method is either the terminal rendering or the cloud rendering. As described above, the processing for deciding the rendering method ends.

Figure 7:
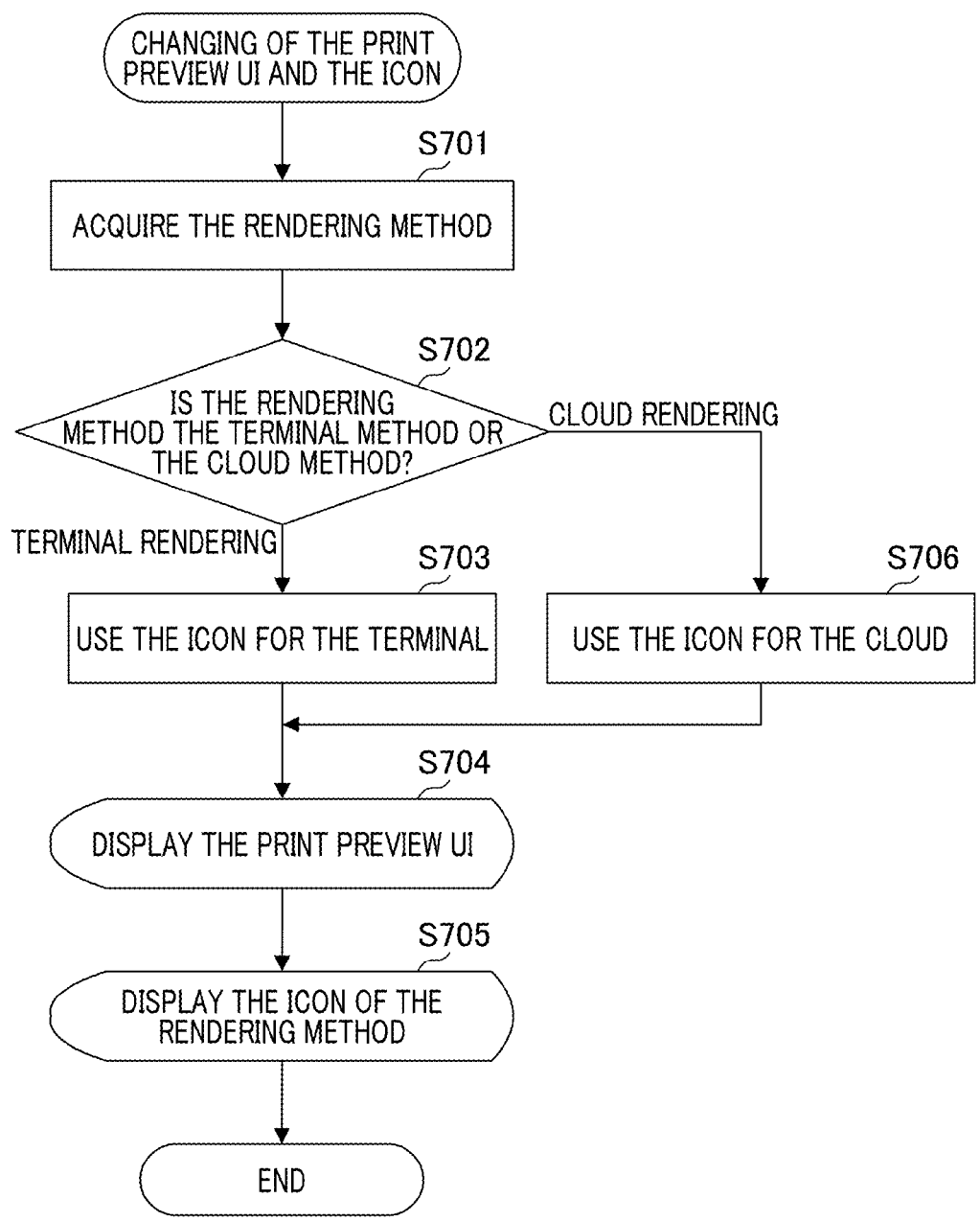
FIG. 7 is a flow chart illustrating processing for displaying an icon of the rendering method.

FIG. 7 is a flow chart illustrating the details of the processing for displaying an icon of the print preview UI and the rendering method in step S405 of the flow chart shown in FIG. 4. Firstly, in step S701, the print application 304 acquires the rendering method decided in the flow chart shown in FIG. 6. Next, in step S702, the print application 304 determines whether the acquired rendering method is the cloud rendering or the terminal rendering. If the acquired rendering method is the terminal rendering, the processing proceeds to step S703. Then, in step S703, the print application 304 decides to use the icon for the terminal rendering as the icon for the rendering of the print application 304. In contrast, if the acquired rendering method is the cloud rendering, the processing proceeds to step S706. Then, in step S706, the print application 304 decides to use the icon for the cloud rendering as the icon for the rendering of the print application 304. Next, in step S704, the print application 304 displays the print preview UI. Then, in step S705, the print application 304 displays the icon of the rendering method that has been decided in step S703 or step S706. Note that the processing in step S704 and the processing in step S705 may be simultaneously executed. By the above processing, the print preview UI according to the selected rendering method is displayed on the print application 304.

Figure 8:
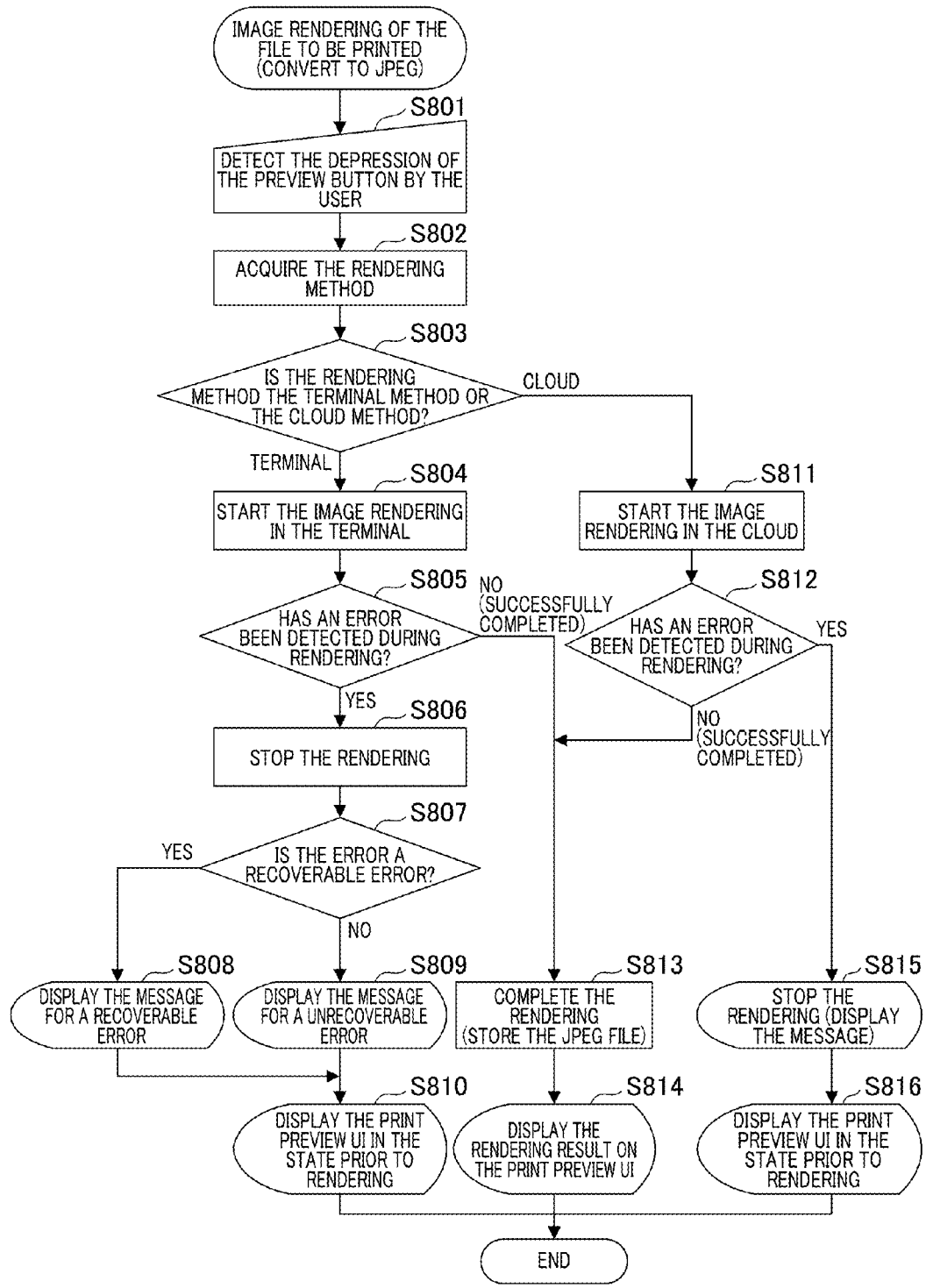
FIG. 8 is a flow chart illustrating processing for rendering the file to be printed.

FIG. 8 is a flow chart illustrating details of the processing for rendering the file to be printed in step S406 of the flow chart shown in FIG. 4. Firstly, in step S801, the print application 304 detects a preview display instruction from the print preview UI by the user pressing the preview button. Note that, in the present embodiment, as this preview button is triggered, the rendering processing of the print application 304 is executed. However, the rendering processing may be automatically executed by means of a unit other than the preview button.

Next, in step S802, the print application 304 acquires the rendering method, and determines whether the acquired rendering method is the cloud rendering or the terminal rendering in step S803. If the acquired rendering method is the terminal rendering (terminal), the processing proceeds to step S804. Then, in step S804, the print application 304 starts the image rendering in the terminal. Next, in step S805, the print application 304 determines whether or not an error occurs during the rendering processing. If any error has occurred during rendering (YES), the processing proceeds to step S806. In step S806, the print application 304 stops the rendering and the processing proceeds to step S807. Next, in step S807, the print application 304 determines whether or not the error occurred during rendering is a recoverable error. Here, unrecoverable errors are various types of errors, for example, an error in which the function is included that is not supported in the PDF file. Recoverable errors are various types of errors, for example, an error in which temporary work memory area is insufficient.

If the error is a recoverable error (YES), the processing proceeds to step S808. In step S808, the print application 304 displays a message indicating the error is a recoverable error with an error notification, and the processing proceeds to step S810. In contrast, if the error is an unrecoverable error (NO), the processing proceeds to step S809. In step S809, the print application 304 displays a message indicating the error is an unrecoverable error with an error notification, and the processing proceeds to step S810. Then, in step S810, the print application 304 displays the print preview UI by returning to the state prior to rendering, and the processing ends. If the acquired rendering method is the cloud rendering in step S803 (cloud), the processing proceeds to step S811. Then, in step S811, the print application 304 performs the image rendering using the cloud server. Next, in step S812, the print application 304 determines whether or not the error occurs during the rendering processing. If any error has occurred during rendering (YES), the processing proceeds to step S815. In step S815, the print application 304 stops the rendering and the processing proceeds to step S816. Next, in step S816, the print application 304 displays the print preview UI by returning to the state prior to rendering, and the processing ends.

If no error occurs during rendering (NO) in step S805 or step S812, that is, the rendering is successfully completed, the processing proceeds to step S813. Then, in step S813, the print application 304 stores the generated image file (in the present embodiment, a JPEG file) for which the rendering has been completed in the print application 304. Next, in step S814, the print application 304 displays the rendering result on the print preview UI, and the processing ends. By the above processing, the print application 304 selects the rendering method according to the selected file, and performs the rendering according to the instruction of the user.

Figure 9:
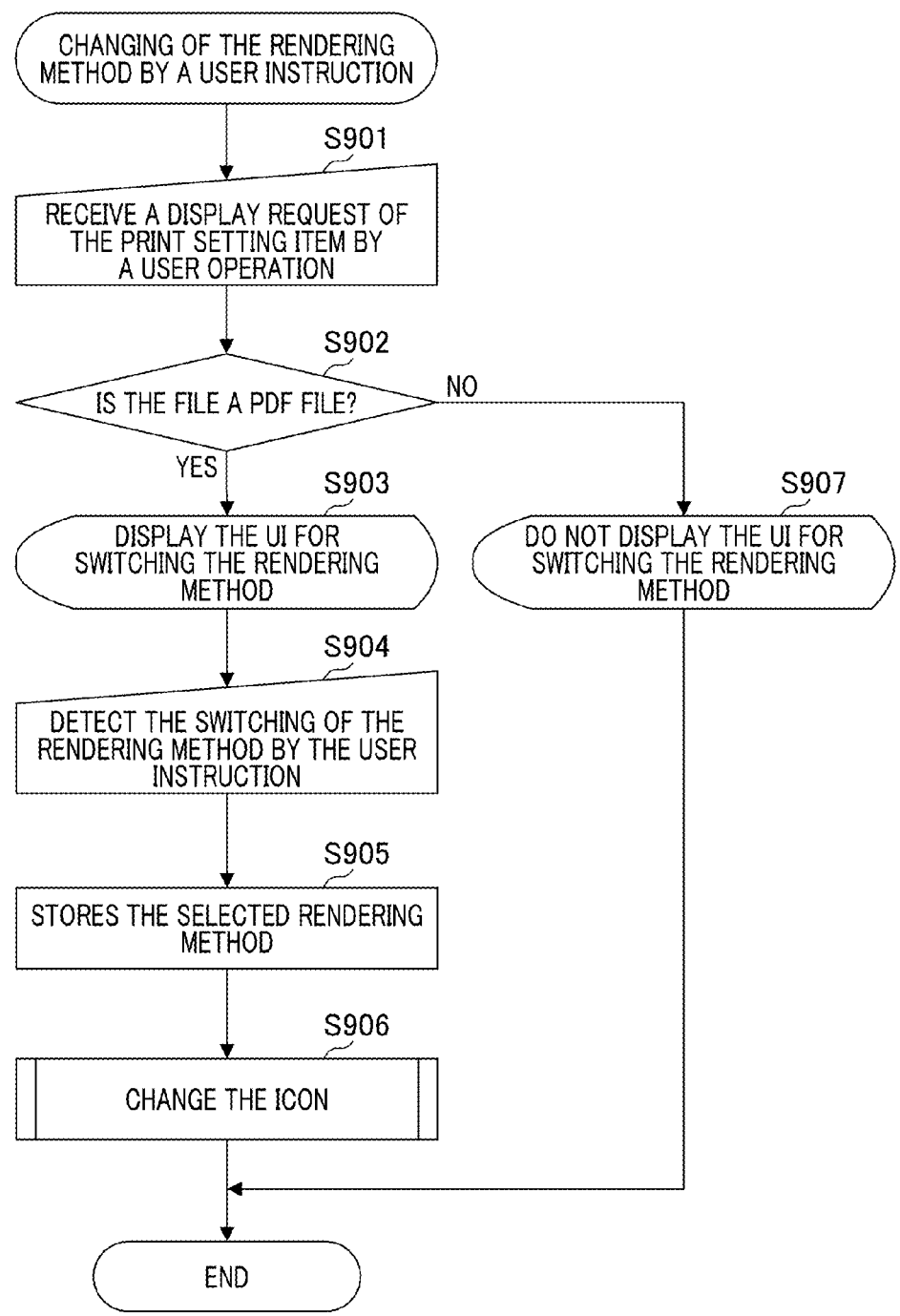
FIG. 9 is a flow chart illustrating processing for changing the rendering method.

FIG. 9 is a flow chart illustrates the processing for changing the rendering method by the user instruction of the print application 304. The processing is started by pressing the button for changing the print setting on the print preview UI of the print application 304 while displaying the print preview UI. Since the processing is an interrupt instruction by the user, the processing may be optionally performed after step S405 of the flow chart shown in FIG. 4.

Firstly, in step S901, the print application 304 receives a display request for a print setting item from the user. Next, in step S902, the print application 304 determines whether or not the selected file is the PDF file. If the selected file is the PDF file (YES), the processing proceeds to step S903. In contrast, if the selected file is not a PDF file (NO), the processing proceeds to step S907. Since the rendering method cannot be switched if the file is not the PDF file, in step S907, the print application 304 does not display the item for changing the rendering method on the print setting screen. In this manner, the user cannot optionally switch the rendering method. Therefore, the processing ends.

Next, in step S903, the print application 304 displays the item for changing the rendering method on the print setting screen. Then, in step S904, the print application 304 detects the operation of the user for switching the rendering method, and in step S905, the print application 304 stores the selected rendering method. Next, in step S906, the changing of the icon of the rendering method is performed. The changing method for the icon is the processing of the flow chart shown in FIG. 7.

Figure 10:
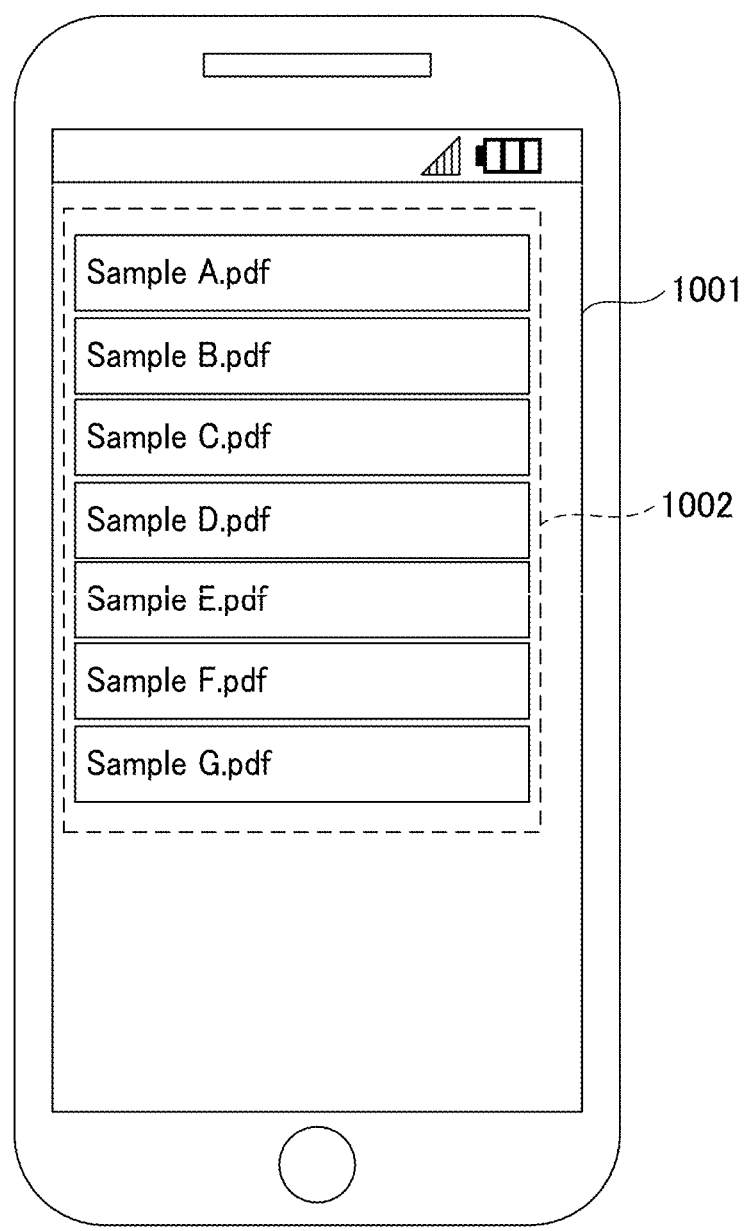
FIG. 10 is a diagram illustrating an example of a UI of a list to be printed.

FIG. 10 is a diagram illustrating an example of the UI of the print application 304 of the mobile terminal 101. A UI 1001 of the print application 304 is displayed on the display 115 via the display control unit 108 in FIG. 1. A file list display unit 1002 is a list of the files to be printed that is displayed by the print application 304 in step S511 of the flow chart shown in FIG. 5. Therefore, the file in the mobile terminal 101 is displayed as a list. Note that the files displayed in the list are variable due to the processing in step S501 or S502.

Figure 11:
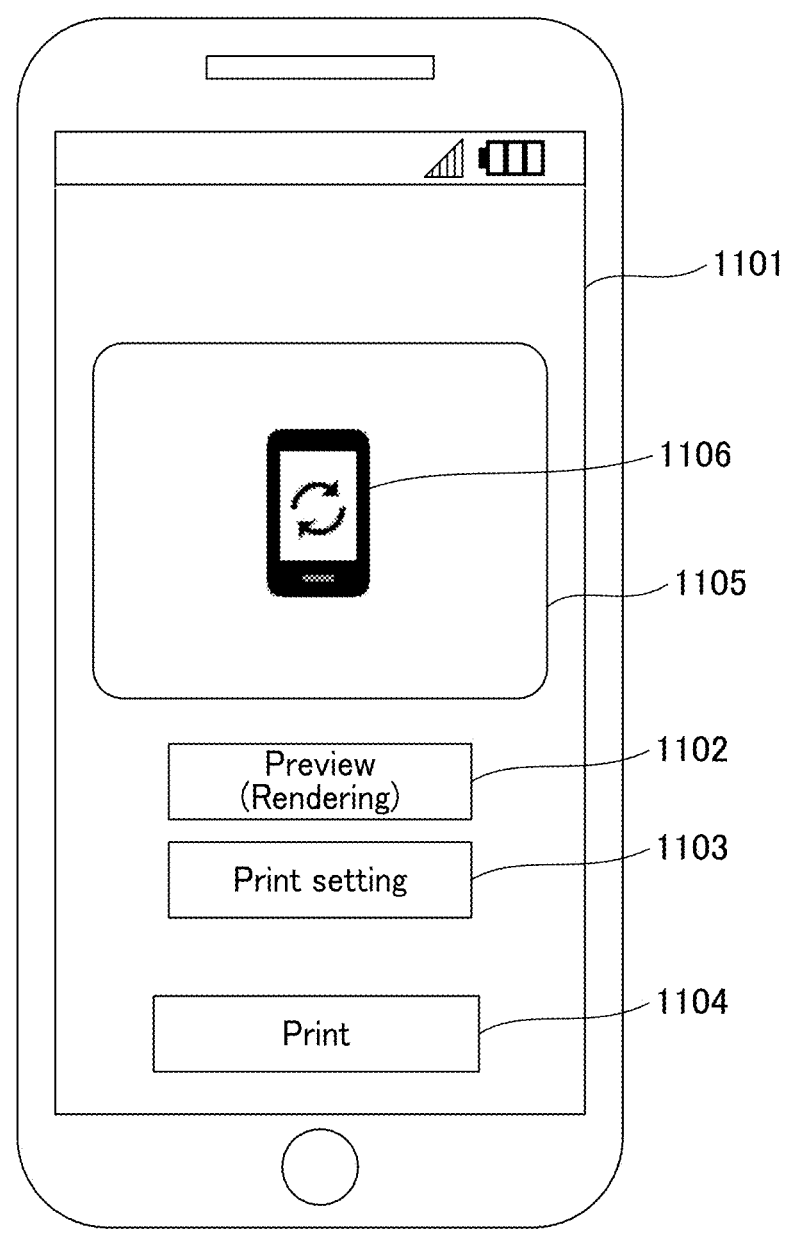
FIG. 11 is a diagram illustrating an example of a UI of the icon for rendering in the terminal.

FIG. 11 is a diagram illustrating an example of the UI of the print application 304 of the mobile terminal. FIG. 11 is the same print preview UI of the print application 304 as the UI in FIG. 10. A UI 1101 is displayed by the print application 304 in step S704 in FIG. 7. The rendering is started by the user pressing a preview button 1102. The processing in the case where the preview button 1102 is pressed is the processing in step S802 in FIG. 8. A print setting screen shown in FIG. 16 (described below) is displayed by the user pressing a print setting button 1103. The processing in the case where the print setting button 1103 is pressed is the processing in step S901 in FIG. 9. Then, the printing is started by the user pressing a print button 1104. The processing in the case where the print button 1104 is pressed corresponds to the step S411. The image data for which the rendering has been completed is displayed on a preview display area 1105. The UI 1101 shown in FIG. 11 indicates the state where the rendering has not been completed, and an icon 1106, which is the icon indicating the rendering method, is displayed. The icon 1106 is the icon indicating the terminal rendering. This icon is the rendering method decided in step S703 and is displayed in step S705. Note that the icon of the terminal rendering is displayed in this figure.

Figure 12:
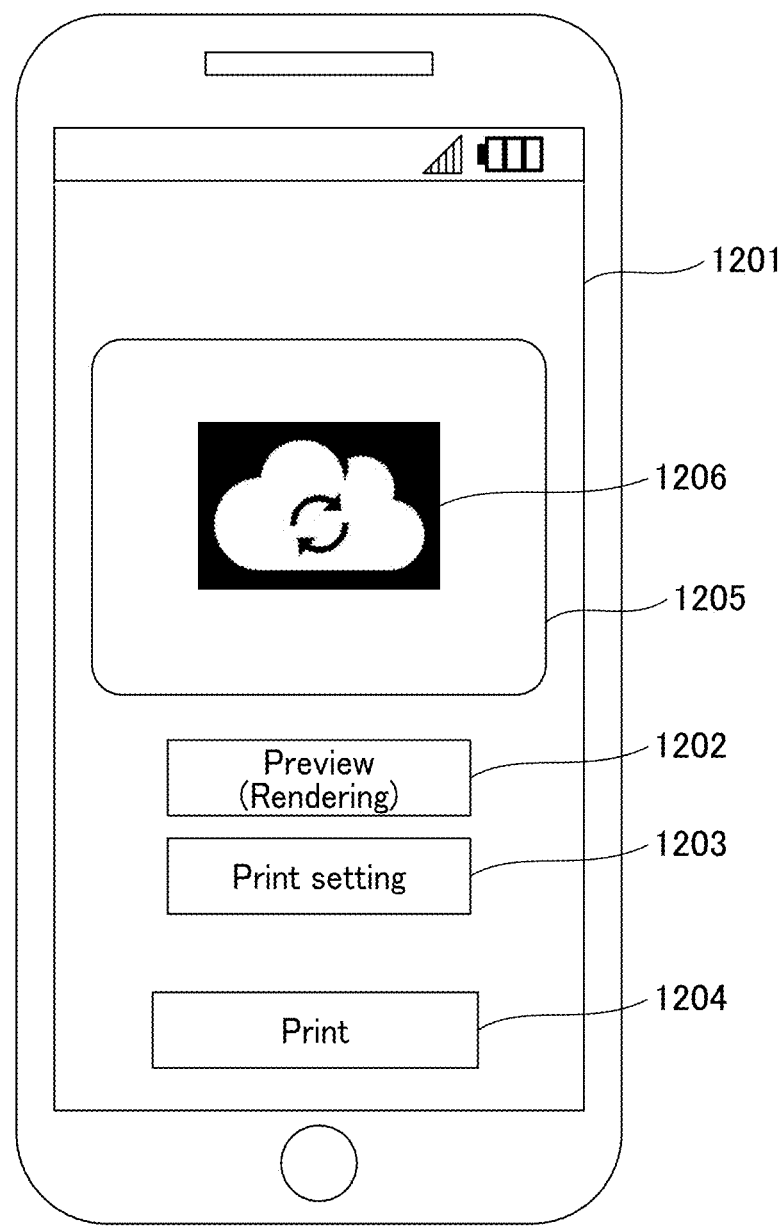
FIG. 12 is a diagram illustrating an example of a UI of the icon for rendering in a cloud.

FIG. 12 is a diagram illustrating an example of the UI of the print application of the mobile terminal. Since the UI 1201 to the display area 1205 are the same as the UI 1101 to the display area 1105 shown in FIG. 11, detailed descriptions thereof are omitted. The icon 1206 is the icon indicating the cloud rendering. This icon is the rendering method decided in step S704 and is displayed in step S705. Note that the icon of the cloud rendering is displayed in this figure.

Figure 13:
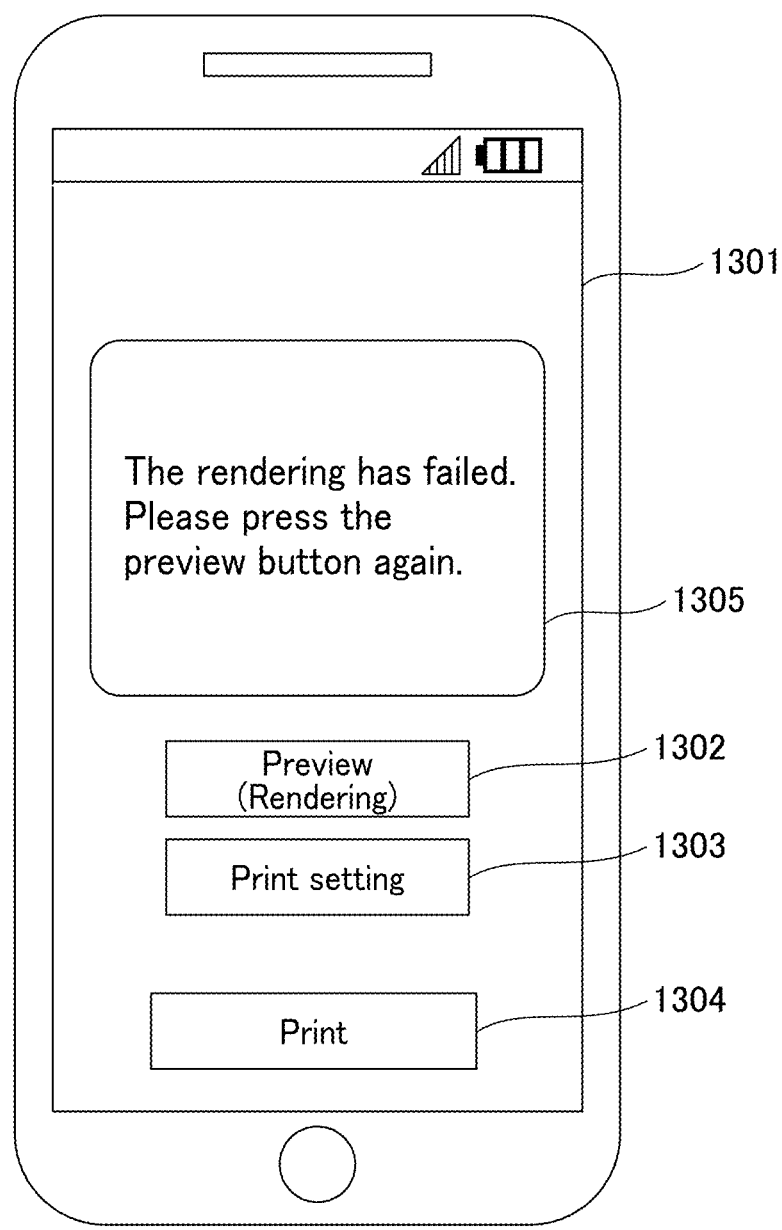
FIG. 13 is a diagram illustrating an example of a UI of a message indicating recoverable error.

FIG. 13 is a diagram illustrating an example of the UI of the print application of the mobile terminal. Since the UI 1301 to the print button 1304 are the same as the UI 1101 to the print button 1104 shown in FIG. 11, detailed descriptions thereof are omitted. A display area 1305 is a preview display area. In this Figure, the state where the rendering error has occurred in step S808 and the message indicating a recoverable error is displayed.

Figure 14:
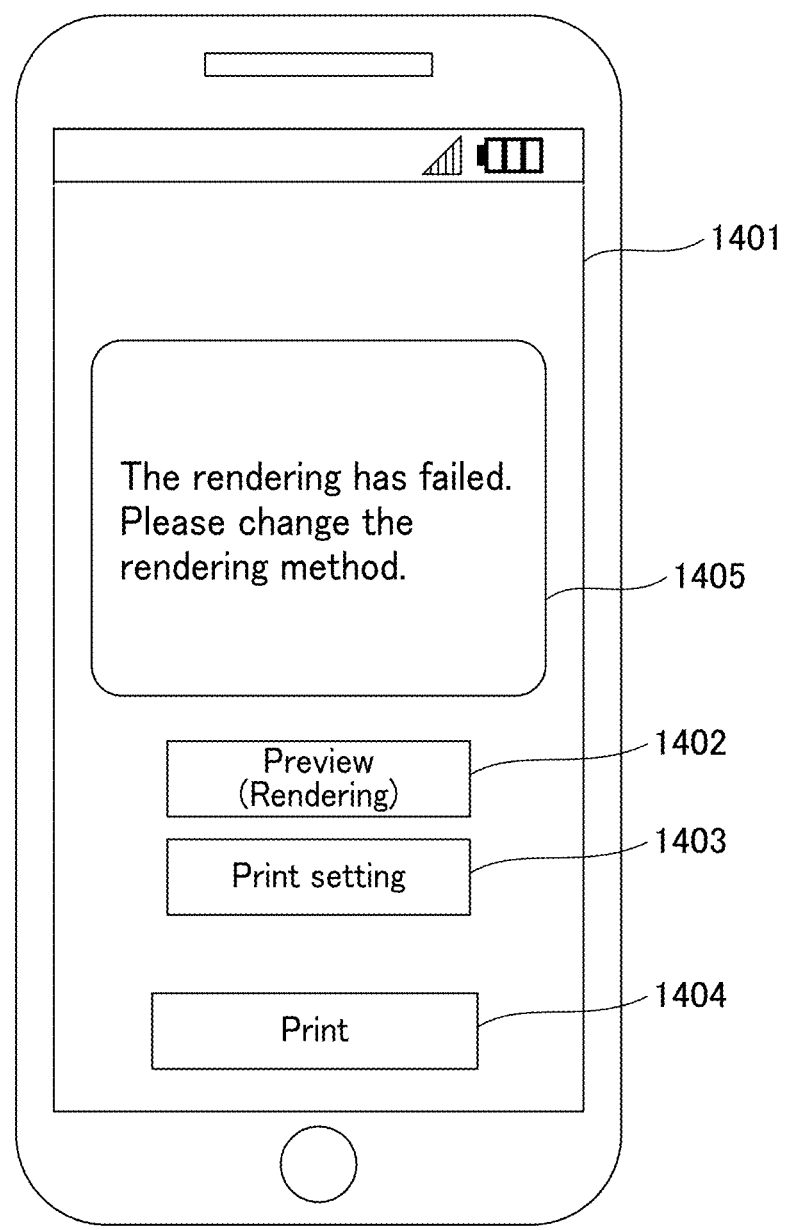
FIG. 14 is a diagram illustrating an example of a UI of a message indicating unrecoverable error.

FIG. 14 is a diagram illustrating an example of the UI of the print application of the mobile terminal. Since the UI 1401 to the print button 1404 are the same as the UI 1101 to the print button 1104 shown in FIG. 11, detail descriptions thereof are omitted. A display area 1405 is a preview display area. In this Figure, the state where the rendering error is occurred in step S809 and the message indicating unrecoverable error is displayed.

Figure 15:
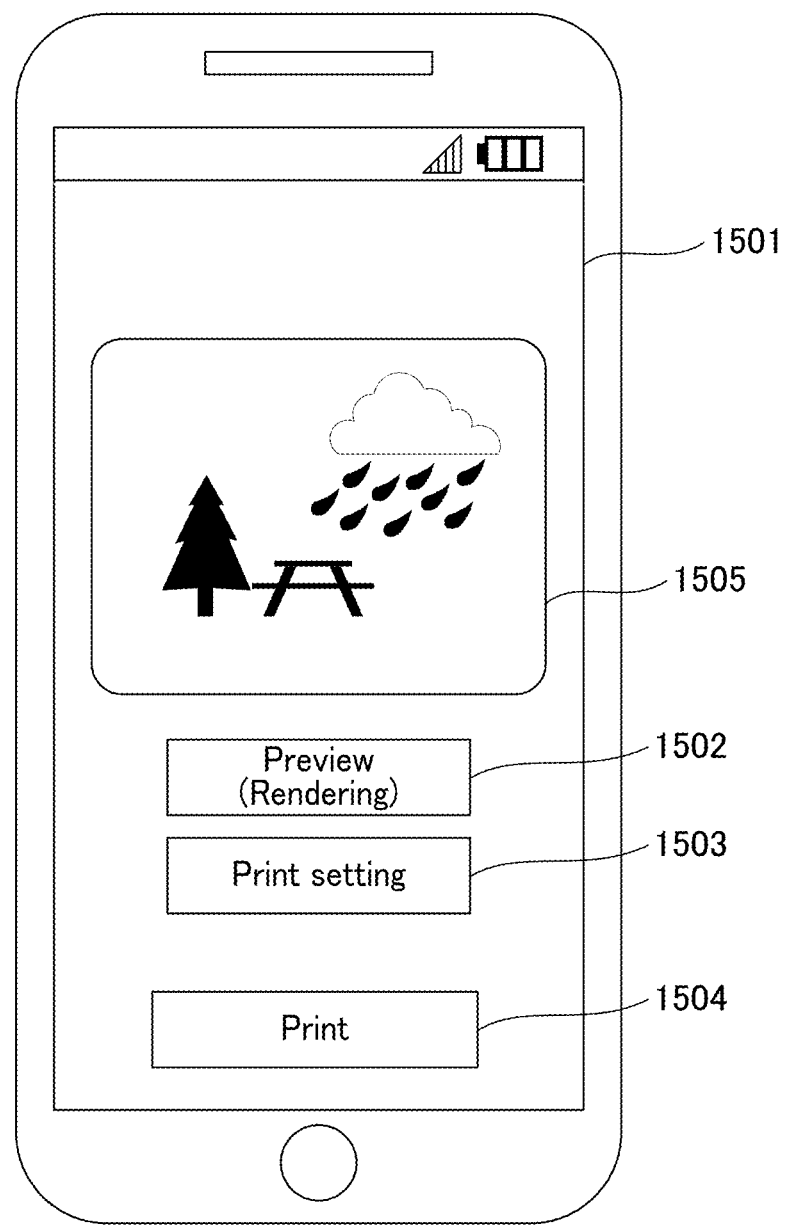
FIG. 15 is a diagram illustrating an example of a UI of a rendering result.

FIG. 15 is a diagram illustrating an example of the UI of the print application of the mobile terminal. Since the UI 1501 to the print button 1504 are the same as the UI 1101 to the print button 1104 shown in FIG. 11, detailed descriptions thereof are omitted. A display area 1505 is a preview display area. In this Figure, the state where the rendering has been completed in step S813 and the rendering result is displayed in step S814 is displayed. As described the above, the difference between the rendering methods in FIGS. 13, 14, and 15 on the UI has been described. Next, the UI for switching the rendering method will be described.

Figure 16:
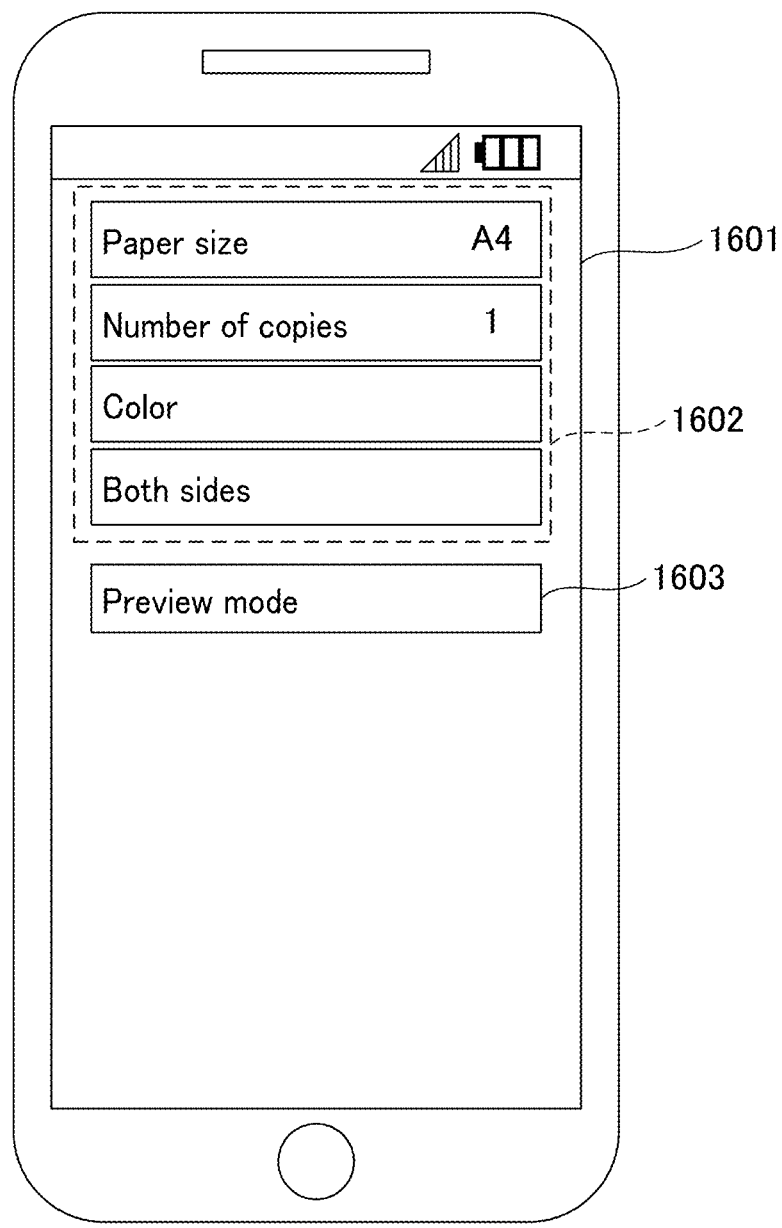
FIG. 16 is a diagram illustrating an example of a UI of a print setting.

FIG. 16 is a diagram illustrating an example of the UI of the print application of the mobile terminal. Since the UI 1601 is the same as the UI 1101 shown in FIG. 11, the detailed description thereof is omitted. The UI 1601 is displayed if the print setting button 1103 shown in FIG. 11 is pressed. The operation is the processing in which the print application 304 receives the display request of the print setting item by the user operation in step S901. A print setting item 1602 is a print setting item. A button 1603 is a setting button of the preview mode. In the present embodiment, the setting button of the preview mode is adopted as one of the print settings, and the rendering method may be switched by this button. If the button 1603 is pressed, the UI shown in FIG. 17 is displayed.

Figure 17:
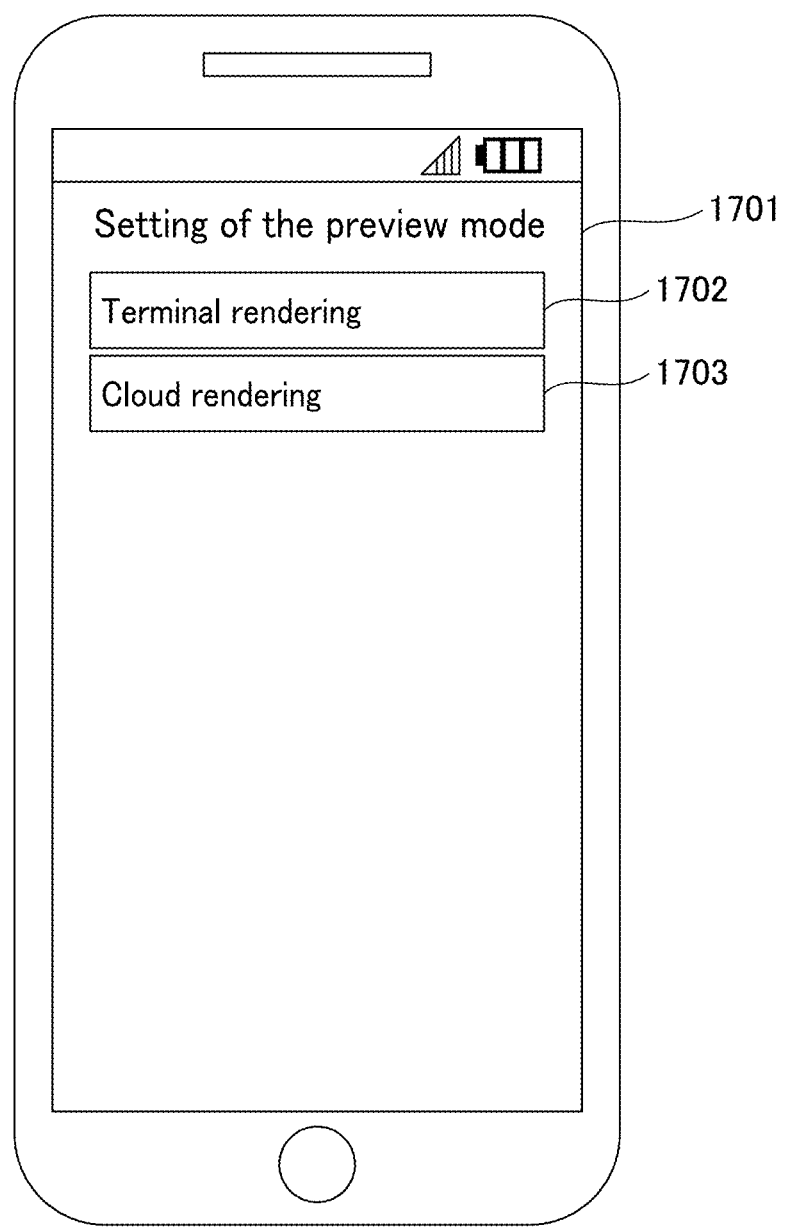
FIG. 17 is a diagram illustrating an example of a UI of a setting of the rendering method.

FIG. 17 is a diagram illustrating an example of the UI of the print application of the mobile terminal. Since the UI 1701 is the same as the UI 1101 shown in FIG. 11, the detailed description thereof is omitted. In the present embodiment, the UI indicates switching for two rendering methods of a button 1702 and a button 1703. If the button 1702 is pressed, the rendering method is switched to the terminal rendering, and if the button 1703 is pressed, the rendering method is switched to the cloud rendering. The processing for switching the rendering method is the processing in step S904.

As described the above, according to the invention, if there are a plurality of rendering engines for printing from a mobile terminal, the use of either rendering engine is visually communicated and the rendering method is automatically switched in accordance with the function that the rendering engine supports. With this manner, the user can perform efficient printing.

(Second Embodiment)

In the first embodiment, the description in which, if there are a plurality of rendering engines for printing from a mobile terminal, the use of either rendering engine is visually communicated and the rendering method is automatically switched in accordance with the function that the rendering engine supports has been described. However, in fact, since the rendering may not be performed due to a limitation such as the characteristic and the specification of the rendering engine by switching the rendering engine according to the type of the file to be printed, it is difficult to automatically switch. Therefore, in the present embodiment, the method for switching that takes into consideration the rendering engine limit will be described. Note that, in the present embodiment, the differences with the first embodiment will be described, and a detailed description of the same part as that of the first embodiment will be omitted.

Figure 18:
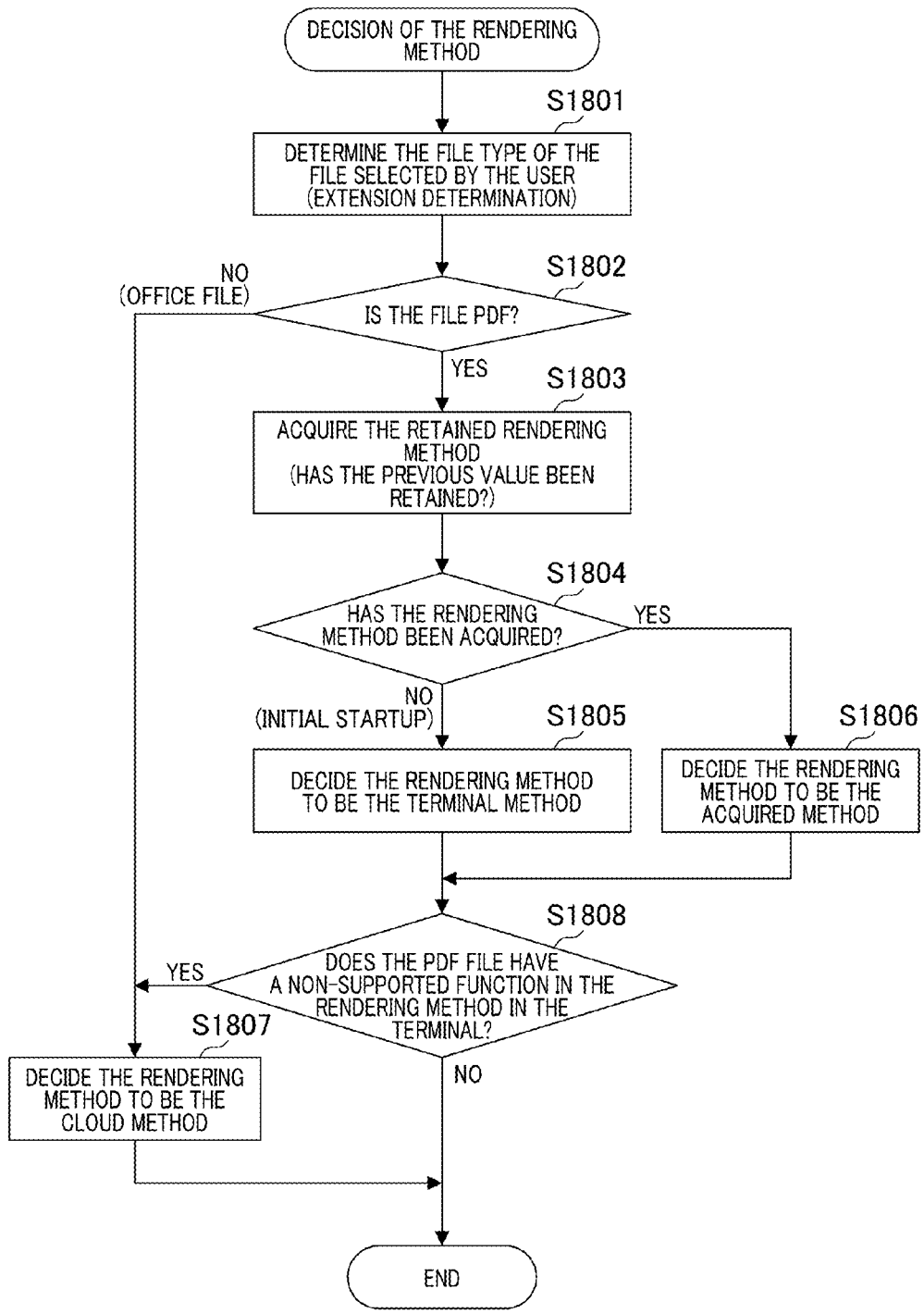
FIG. 18 is a flow chart illustrating processing for deciding the rendering method.

FIG. 18 is a flow chart illustrating the detailed processing for deciding the rendering method in step 5404, shown in FIG. 4, relating to the print application 304. FIG. 18 is obtained by modifying FIG. 6 in the first embodiment, and since step S1801 to step S1807 are same as the step S601 to step S607, detail descriptions thereof are omitted.

After deciding the rendering method in step S1805 or step S1806, in step S1808, the print application 304 determined whether or not the selected PDF file has a non-supported function in the rendering method in the terminal. If the PDF file has a non-supported function (YES), the processing proceeds to step S1807. In step S1807, the print application 304 switches the rendering method to the cloud method. In contrast, if the PDF file does not have the non-supported function (NO), the processing ends.

Figure 19:
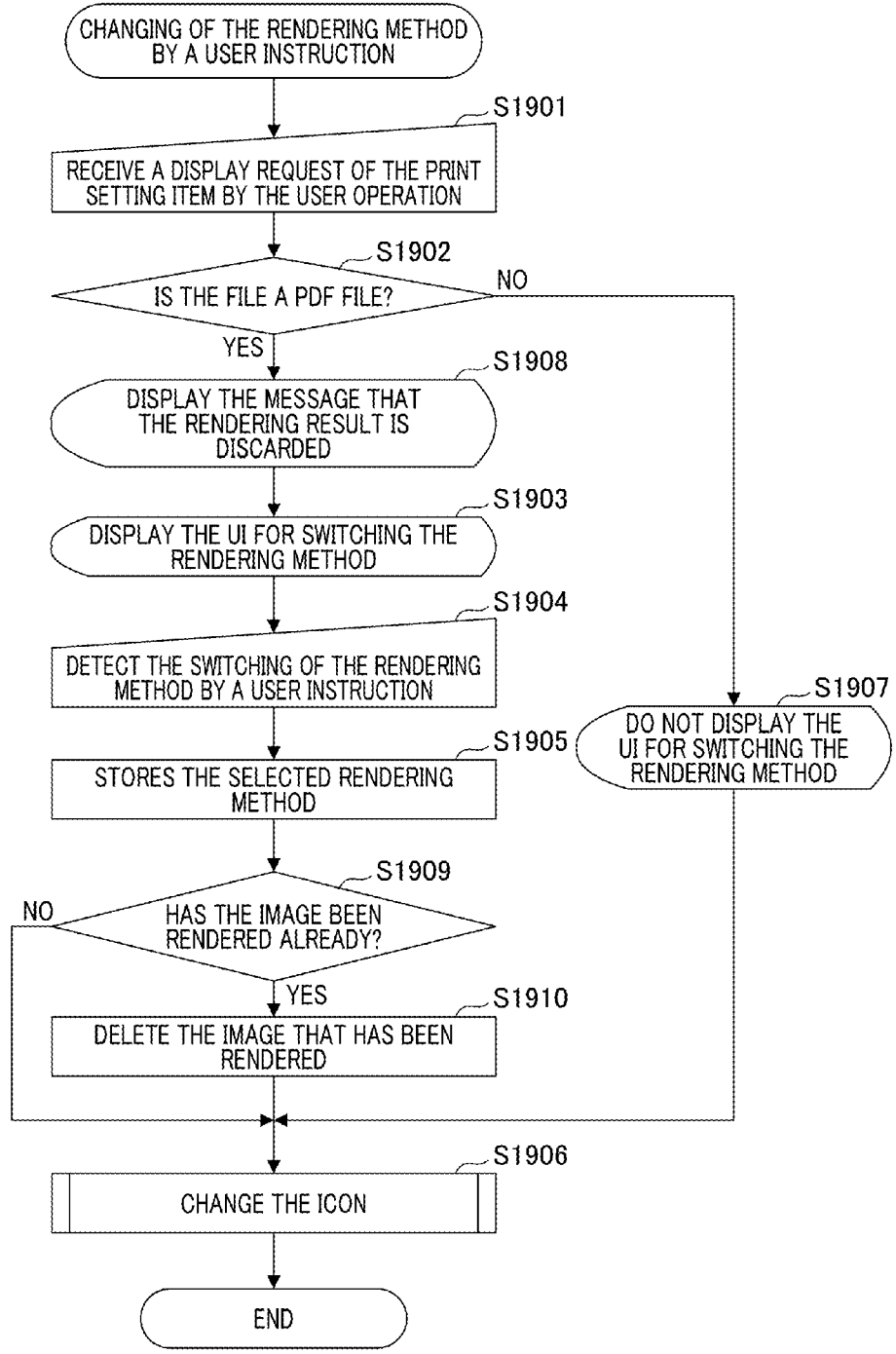
FIG. 19 is a flow chart illustrating processing for changing the rendering method.

FIG. 19 is a flow chart illustrating the processing for changing the rendering method by a user instruction of the print application 304. FIG. 19 is obtained by modifying FIG. 9 in the first embodiment, and since step S1901 to step S1907 are same as the step S901 to step S907, detailed descriptions thereof are omitted. In the first embodiment, the processing is started by pressing the button for changing the print setting from the print preview UI of the print application 304. Since this processing is started by an interrupt instruction of the user, the processing is optionally performed after step S405 in FIG. 4. In contrast, in the present embodiment, the processing is the processing in the state where the rendering method is changed after completing the rendering in addition to this. That is, the processing is the processing in the state where the interrupt instruction of the user is performed between step S408 and step S409 in FIG. 4.

In step S1902, the selected file is a PDF file (YES), and the processing proceeds to step S1908. In step S1908, the print application 304 displays in the UI on the print setting screen a message that the rendering result is discarded. Then, in step S1905, a new rendering method is stored, and then in step S1909, the print application 304 determines whether or not the image has been rendered. If the image has been rendered (YES), the processing proceeds to step S1910. In step S1910, the print application 304 deletes the rendered image, and the processing proceeds to step S1906. In contrast, if the image has not been rendered (NO), the processing proceeds to step S1906.

Figure 20:
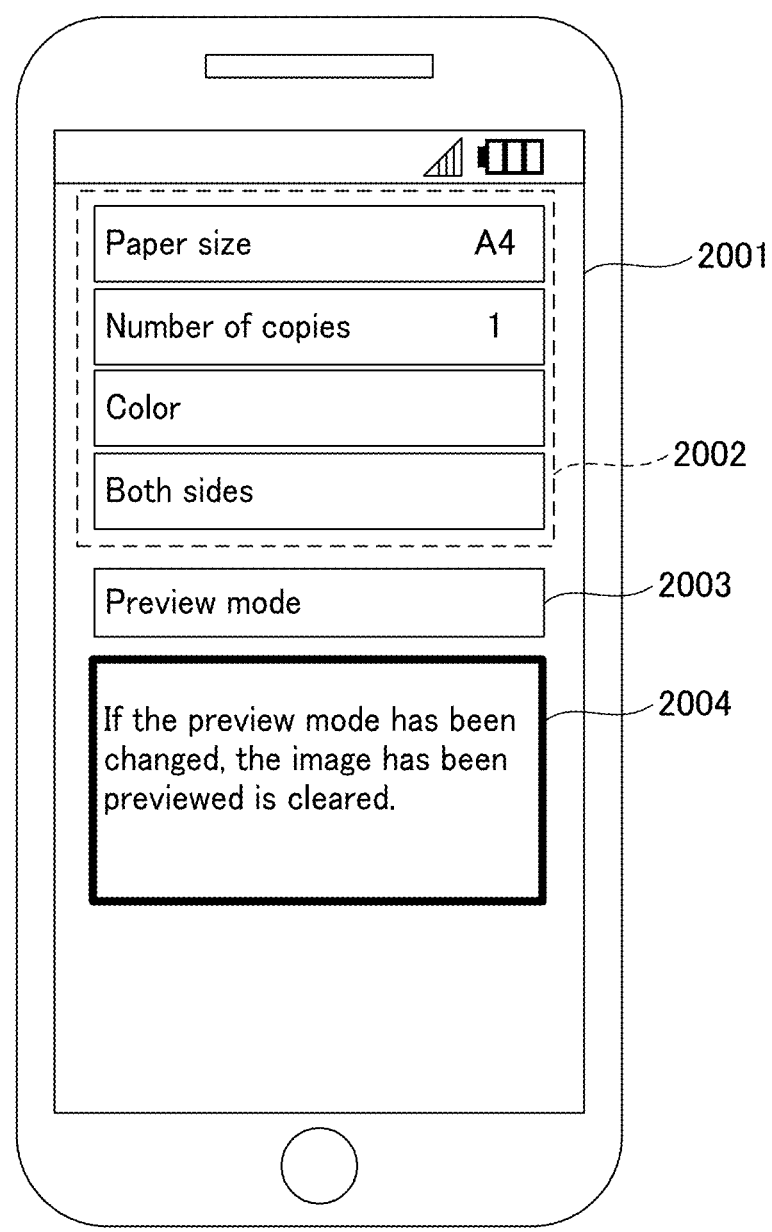
FIG. 20 is a diagram illustrating an example of a UI of the printing application in the mobile terminal.

FIG. 20 is a diagram illustrating an example of the UI of the printing application in the mobile terminal. FIG. 20 is obtained by modifying FIG. 16 in the first embodiment, and since the UI 2001 to the button 2001 are same as the UI 1601 to the button 1603, detail descriptions thereof are omitted. FIG. 20 illustrates the UI of the print application 304 if the user instruction is performed by the processing in step S1901 in FIG. 19. In the present embodiment, unlike the first embodiment, the image has been rendered. Therefore, if the button of the print setting 1503 is pressed in the state of FIG. 15, the UI in FIG. 20 is displayed. The difference between the UI in FIG. 20 and the UI in FIG. 16 is that a massage display area is added on a display area 2004. The print application 304 displays the message, for which the rendering result is discarded, on the display area 2004. Note that this is the processing in step S1908 in FIG. 19.

As described the above, in the present embodiment, the method for switching the rendering engine in the case where the rendering cannot be performed due to the limitation such as the characteristic and the specification of the rendering engine has been described. With this manner, the rendering method can be automatically switched even if the file to be printed cannot be rendered by the rendering engine.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-243745, filed Dec. 2, 2014, which is hereby incorporated by reference wherein in its entirety.

What is claimed is:

1. An information processing apparatus, comprising:
one or more processors; and
a memory in communication with the one or more processors, the memory having stored thereon instructions that, when executed by the one or more processors, cause the information processing apparatus to:
select a file to be printed;
decide a rendering method from two methods: a first method for rendering the file in a server and a second method for rendering the file in the information processing apparatus;
store the decided rendering method as a previous value;
determine, in a first determination, whether or not the file is in a specific format; and
determine, in a second determination, whether or not there is the previous value stored in the storing if the first determination determines that the file is in the specific format,
wherein the rendering method for the file is decided to be the first method if the first determination determines that the file is not in the specific format, and
wherein the rendering method for the file is decided to be the rendering method stored as the previous value if the second determination determines that there is the previous value.

2. The information processing apparatus according to claim 1, wherein the rendering method is decided to be the second method if the second determination determines that there is no previous value.

3. The information processing apparatus according to claim 1, wherein the instructions, when executed by the one or more processors, further cause the information processing apparatus to:
render the file if the rendering method is decided to be the first method,
wherein the rendering method is stored in accordance with a result of the rendering.

4. The information processing apparatus according to claim 3, wherein the rendering method is stored if the rendering has completed successfully, and the rendering method is not stored if an error has occurred during the rendering.

5. The information processing apparatus according to claim 3, wherein, if the decided rendering method that was changed by a user is received, the file is rendered in accordance with the changed rendering method.

6. The information processing apparatus according to claim 5, wherein if the file has been rendered when the rendering method changed by the user is received, the rendered file is deleted.

7. The information processing apparatus according to claim 1, wherein the specific format is a PDF format.

8. A method for controlling an information processing apparatus, the method comprising:
selecting a file to be printed;
deciding a rendering method from two methods: a first method for rendering the file in a server and a second method for rendering the file in the information processing apparatus;
storing the decided rendering method as a previous value;
first determining whether or not the file is in a specific format; and second determining whether or not there is the previous value stored in the storing if the first determining determines that the file is in the specific format, wherein the deciding decides the rendering method for the file to be the first method if the first determining determines that the file is not in the specific format, and wherein the deciding decides the rendering method for the file to be the rendering method stored as the previous value if the second determining determines that there is the previous value.

9. The method according to claim 8, wherein the deciding decides the rendering method to be the second method if the second determining determines that there is no previous value.

10. The method according to claim 8, further comprising:
rendering the file if the deciding decides the rendering method to be the first method,
wherein the storing stores the rendering method in accordance with a result of the rendering in the rendering.

11. The method according to claim 10, wherein the storing stores the rendering method if the rendering by the rendering is completed successfully, and does not store the rendering method if an error has occurred during the rendering.

12. The method according to claim 10, wherein, if the rendering method, which is decided in the deciding and changed by a user, is received, the rendering renders the file in accordance with the changed rendering method.

13. The method according to claim 12, wherein if the file has been rendered in the rendering when the rendering method changed by the user is received, the rendered file is deleted.

14. The method according to claim 8, wherein the specific format is a PDF format.

15. A non-transitory storage medium storing a readable program for causing a computer to execute a controlling method executed in an information processing apparatus, the method comprising:
selecting a file to be printed;
deciding a rendering method from two methods: a first method for rendering the file in a server and a second method for rendering the file in the information processing apparatus;
storing the decided rendering method as a previous value;
first determining whether or not the file is in a specific format; and
second determining whether or not there is the previous value stored in the storing if the first determining determines that the file is in the specific format, wherein the deciding decides the rendering method for the file to be the first method if the first determining determines that the file is not in the specific format, and wherein the deciding decides the rendering method for the file to be the rendering method stored as the previous value if the second determining determines that there is the previous value.

16. A method for controlling an information processing apparatus, the method comprising:
selecting a file to be printed;
deciding a rendering method from two methods: a first method for rendering the file in a server and a second method for rendering the file in the information processing apparatus;
storing the decided rendering method as a previous value;
first determining a format of the file; and
second determining whether or not there is the previous value stored in the storing if the first determining determines that the file is in a first format, wherein the deciding decides the rendering method for the file to be the first method if the first determining determines that the file is a second format, and wherein the deciding decides the rendering method for the file based on the rendering method stored as the previous value if the second determining determines that there is the previous value.

17. The method according to claim 16, wherein the deciding decides the rendering method to be the second method if the second determining determines that there is no previous value.

18. The method according to claim 16, further comprising:
rendering the file if the deciding decides the rendering method to be the first method,
wherein the storing stores the rendering method in accordance with a result of the rendering in the rendering.

19. The method according to claim 16, wherein the storing stores the rendering method if the rendering by the rendering is completed successfully, and does not store the rendering method if an error has occurred during the rendering.

20. The method according to claim 16, wherein, if the rendering method, which is decided in the deciding and changed by a user, is received, the rendering renders the file in accordance with the changed rendering method.

\* \* \* \* \*